(12) United States Patent
Ono et al.

(10) Patent No.: US 9,156,614 B2
(45) Date of Patent: Oct. 13, 2015

(54) LOADING/UNLOADING APPARATUS

(71) Applicant: KABUSHIKI KAISHA YASKAWA DENKI, Kitakyushu-shi (JP)

(72) Inventors: Mitsutaka Ono, Kitakyushu (JP); Mineyasu Morimoto, Kitakyushu (JP); Kazuhiro Umeo, Kitakyushu (JP); Eiji Masuda, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 43 days.

(21) Appl. No.: 13/974,054

(22) Filed: Aug. 23, 2013

(65) Prior Publication Data

US 2014/0064889 A1    Mar. 6, 2014

(30) Foreign Application Priority Data

Aug. 30, 2012  (JP) ................................. 2012-190195

(51) Int. Cl.
*B65G 1/06* (2006.01)
*H02B 3/00* (2006.01)
*H02B 11/12* (2006.01)

(52) U.S. Cl.
CPC .. *B65G 1/06* (2013.01); *H02B 3/00* (2013.01); *H02B 11/12* (2013.01)

(58) Field of Classification Search
CPC ............ H02B 3/00; H02B 11/12; B65G 1/06; B65G 69/22
USPC ............. 414/10, 12, 267, 543, 744.1, 226.05, 414/591; 187/239; 212/294, 295, 225, 226, 212/252, 253
See application file for complete search history.

(56) References Cited

U.S. PATENT DOCUMENTS

| | | | |
|---|---|---|---|
| 1,928,420 A | | 9/1933 | Graves |
| 2,109,304 A | * | 2/1938 | Ormsby ........................ 212/253 |
| 2,547,398 A | * | 4/1951 | Lee .............................. 212/292 |
| 3,964,573 A | | 6/1976 | Wilson |
| 4,265,583 A | * | 5/1981 | Baird et al. ................... 414/284 |
| 4,269,285 A | | 5/1981 | Ohkoshi et al. |
| 5,211,526 A | * | 5/1993 | Robinette ..................... 414/550 |
| 6,041,949 A | * | 3/2000 | Walker et al. ................. 212/179 |

(Continued)

FOREIGN PATENT DOCUMENTS

| | | |
|---|---|---|
| CN | 201781203 U | 3/2011 |
| CN | 102515033 | 6/2012 |
| DE | 3305277 A1 * | 8/1984 |

(Continued)

OTHER PUBLICATIONS

Machine translation of DE3305277A1 from espacenet.*

(Continued)

*Primary Examiner* — Saul Rodriguez
*Assistant Examiner* — Mark Hageman
(74) *Attorney, Agent, or Firm* — Mori & Ward, LLP

(57) ABSTRACT

A loading/unloading apparatus includes a cage configured to accommodate an electric appliance stored or to be stored in one of storage compartments provided within a cubicle; and a hoist configured to vertically move and hang the cage. The hoist includes a boom arranged on the cubicle to extend above the storage compartments and a hoisting winch attached to the boom. The cage includes a frame body provided with a seat for supporting the electric appliance, and a connector unit connected to the hoisting winch.

17 Claims, 17 Drawing Sheets

(56) References Cited

U.S. PATENT DOCUMENTS

| | | | |
|---|---|---|---|
| 8,628,289 B1 * | 1/2014 | Benedict et al. | ............ 414/234 |
| 2011/0255940 A1 | 10/2011 | Wildfeuer | |

FOREIGN PATENT DOCUMENTS

| | | |
|---|---|---|
| GB | 2007622 | 5/1979 |
| JP | 49-35372 | 4/1974 |
| JP | 51-85440 | 7/1976 |
| JP | 54-111638 U | 8/1979 |
| JP | 57-36709 U | 2/1982 |
| JP | 61-10010 U | 1/1986 |
| JP | 64-12098 U | 1/1989 |
| JP | 01-134909 U | 9/1989 |
| JP | 03-120610 U | 12/1991 |
| JP | 05-24606 U | 3/1993 |
| JP | 08-9519 | 1/1996 |
| JP | 2007-55697 | 3/2007 |
| JP | 2007-312452 | 11/2007 |
| KR | 10-1090186 B1 | 12/2011 |

OTHER PUBLICATIONS

Partial European Search Report for corresponding EP Application No. 13181161.4-1801, Oct. 24, 2013.
Extended European Search Report for corresponding EP Application No. 13181161.4-1801, Jan. 29, 2014.
Japanese Office Action for corresponding JP Application No. 2012-190195, Jan. 21, 2014.
Korean Office Action for corresponding KR Application No. 10-2013-0103243, Jan. 30, 2015.
Korean Office Action for corresponding KR Application No. 10-2013-0103243, May 20, 2015.
Chinese Office Action for corresponding CN Application No. 201310384457.2, Jun. 3, 2015.

* cited by examiner

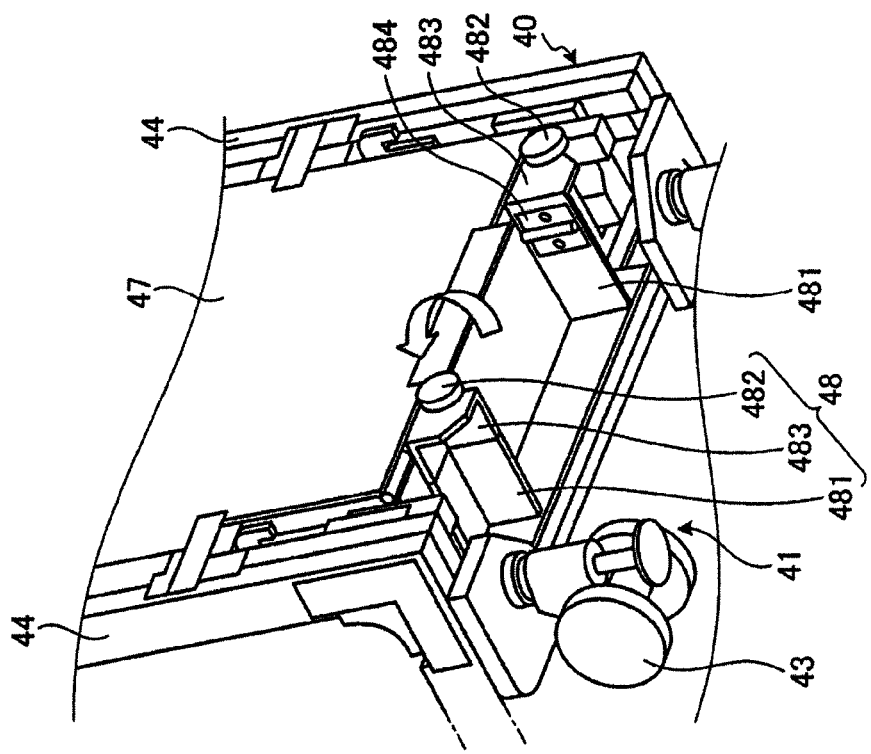
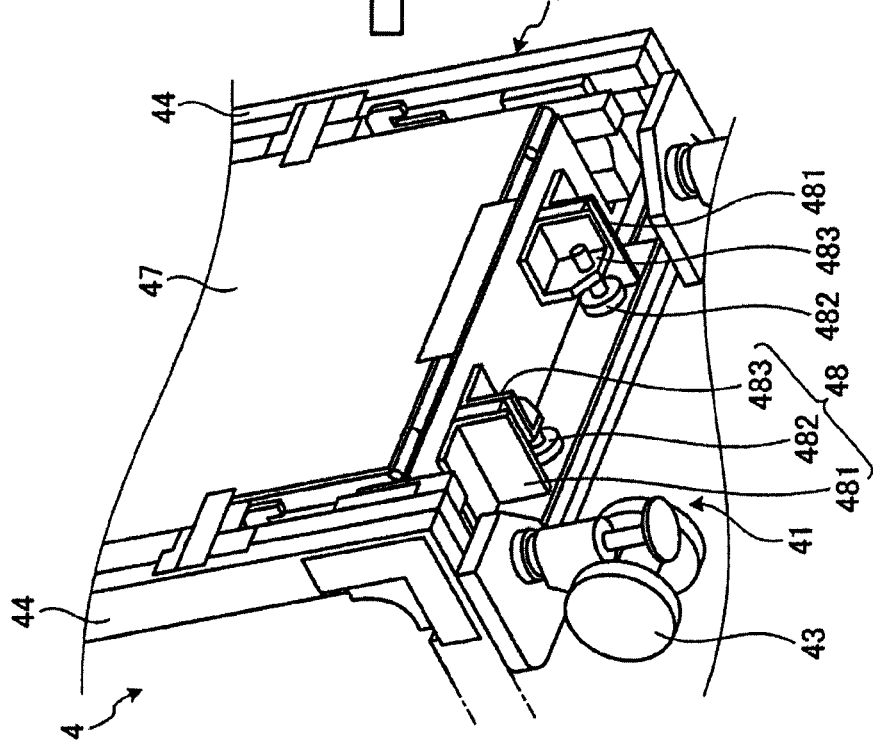

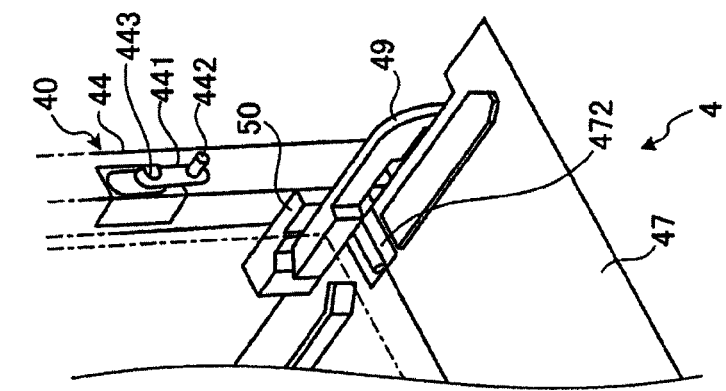
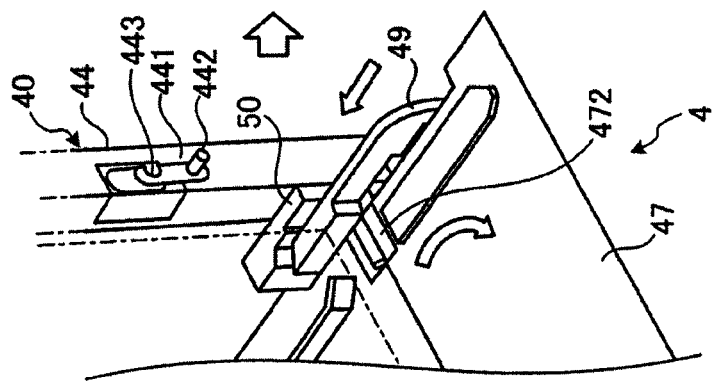
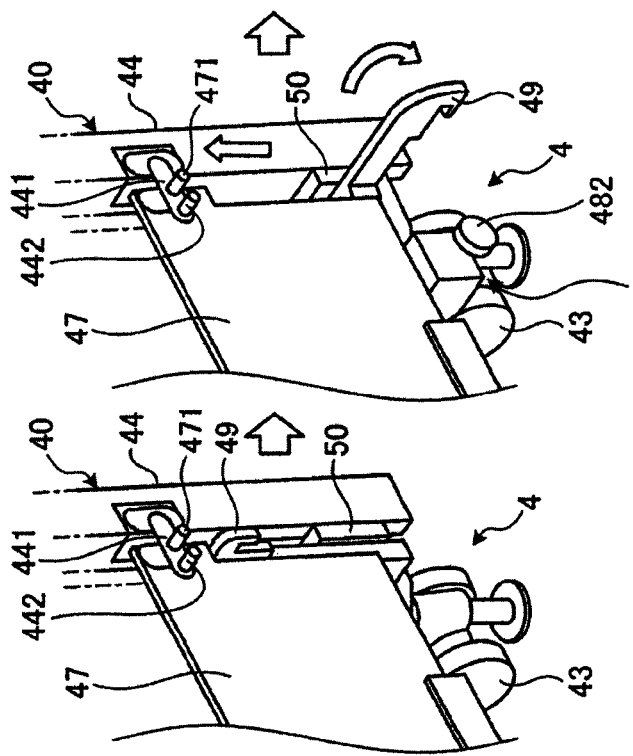

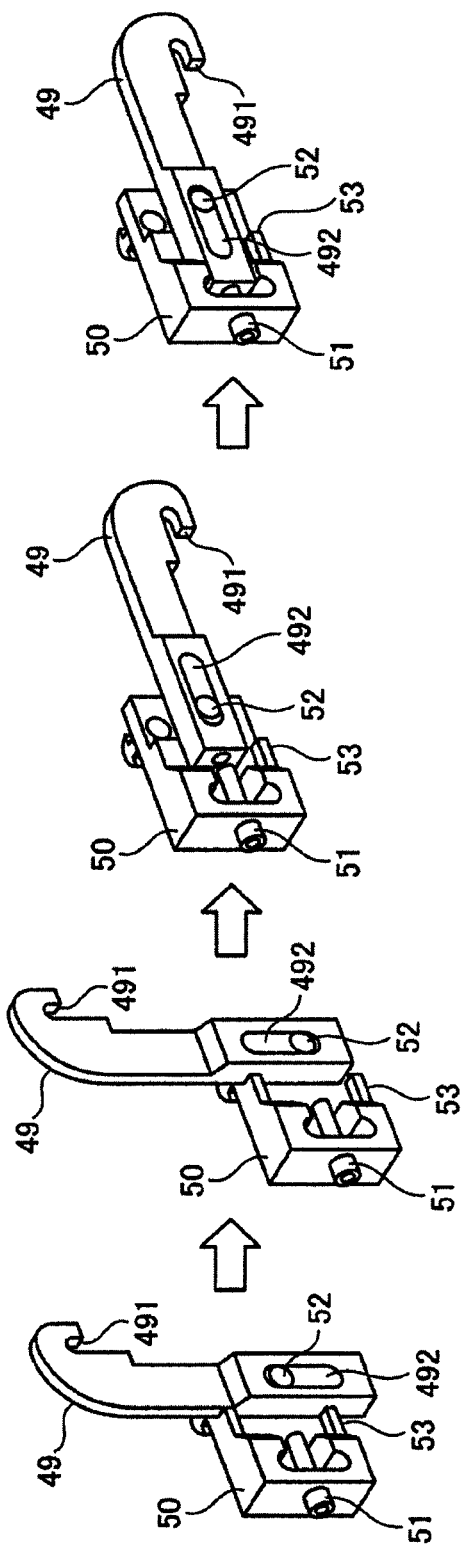

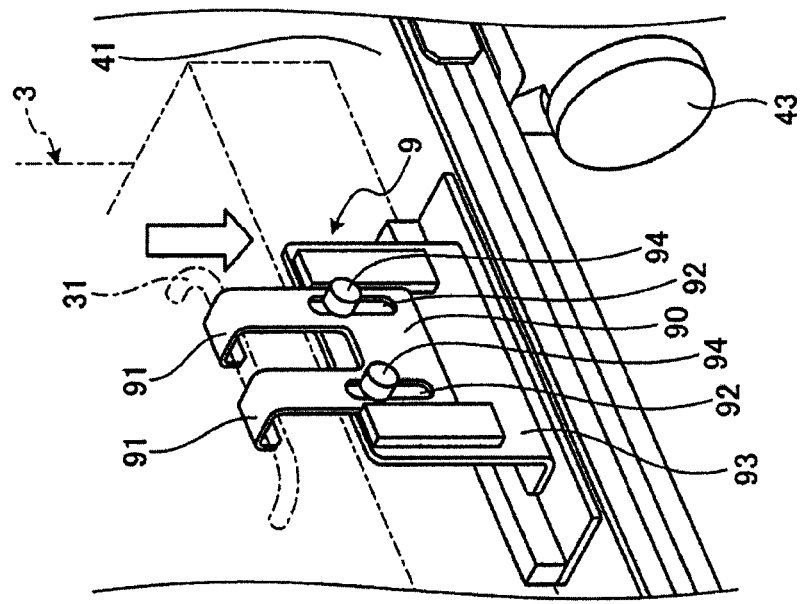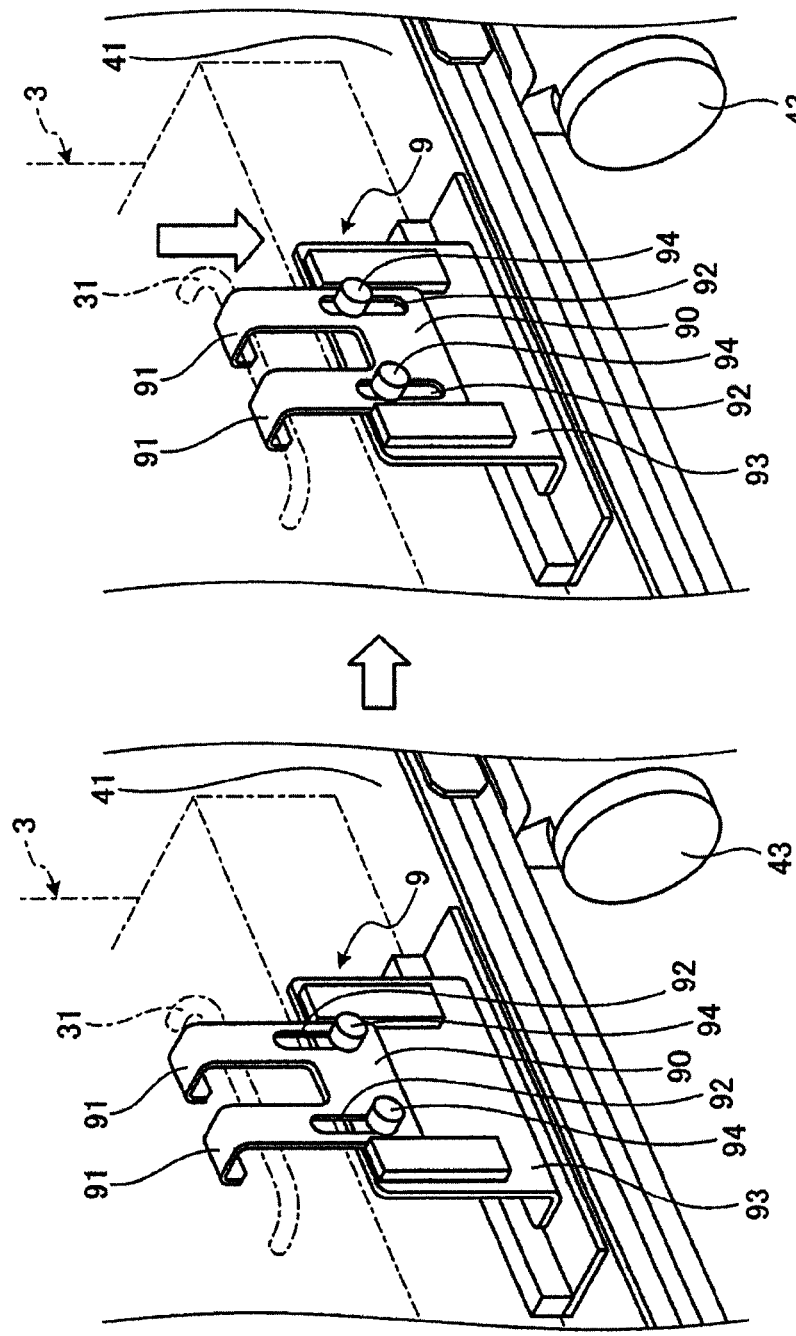

LOADING/UNLOADING APPARATUS

CROSS-REFERENCE TO RELATED APPLICATION

The present disclosure contains subject matter related to that disclosed in Japanese Priority Patent Application No. 2012-190195 filed on Aug. 30, 2012. The contents of this application are incorporated herein by reference in their entirety.

BACKGROUND OF THE INVENTION

1. Field of the Invention

Embodiments disclosed herein relate to a loading/unloading apparatus.

2. Description of the Related Art

Conventionally, a loading/unloading apparatus of, e.g., crane type, has been used in repairing and maintaining electric appliances such as power-converting power cells stacked within a cubicle (see, e.g., Japanese Utility Model Application Publication No. H3-120610).

The loading/unloading apparatus disclosed in the above-cited reference has a configuration in which a detachable rail provided with a hoist is attached to a ceiling portion of a facility.

However, the conventional loading/unloading apparatus cited above is hardly applicable to, e.g., a facility that accommodates power-converting power cells for use in wind power generation. More specifically, in reality, the power-converting power cells for use in wind power generation are relatively heavy and cannot be easily unloaded from the facility. It is also difficult to move the unloaded power cells to a specified place.

The facility is built within a wind power generation tower. However, it is often the case that the effective space existing within the tower is extremely narrow. Thus, a need has existed for a loading/unloading apparatus which is small in size and easy to handle.

SUMMARY OF THE INVENTION

A loading/unloading apparatus according to one embodiment includes a cage configured to accommodate an electric appliance stored or to be stored in one of storage compartments provided within a cubicle; and a hoist configured to vertically move and hang the cage. The hoist includes a boom arranged on the cubicle to extend above the storage compartments and a hoisting winch attached to the boom. The cage includes a frame body provided with a seat for supporting the electric appliance, and a connector unit connected to the hoisting winch.

BRIEF DESCRIPTION OF THE DRAWINGS

FIGS. 6A and 6B are explanatory views showing the configuration of a bumper part of a cage according to one embodiment.

FIGS. 7A through 7D are explanatory views showing the use procedure of the trestle and the engaging part of the cage.

FIGS. 8A through 8D are explanatory views illustrating the operation of the engaging part.

FIGS. 14A and 14B are explanatory views showing an appliance fixing unit of the cage.

DESCRIPTION OF THE EMBODIMENTS

Embodiments of a loading/unloading apparatus disclosed herein will now be described in detail with reference to the accompanying drawings. The present invention is not limited to the embodiments described below.

Figure 1:
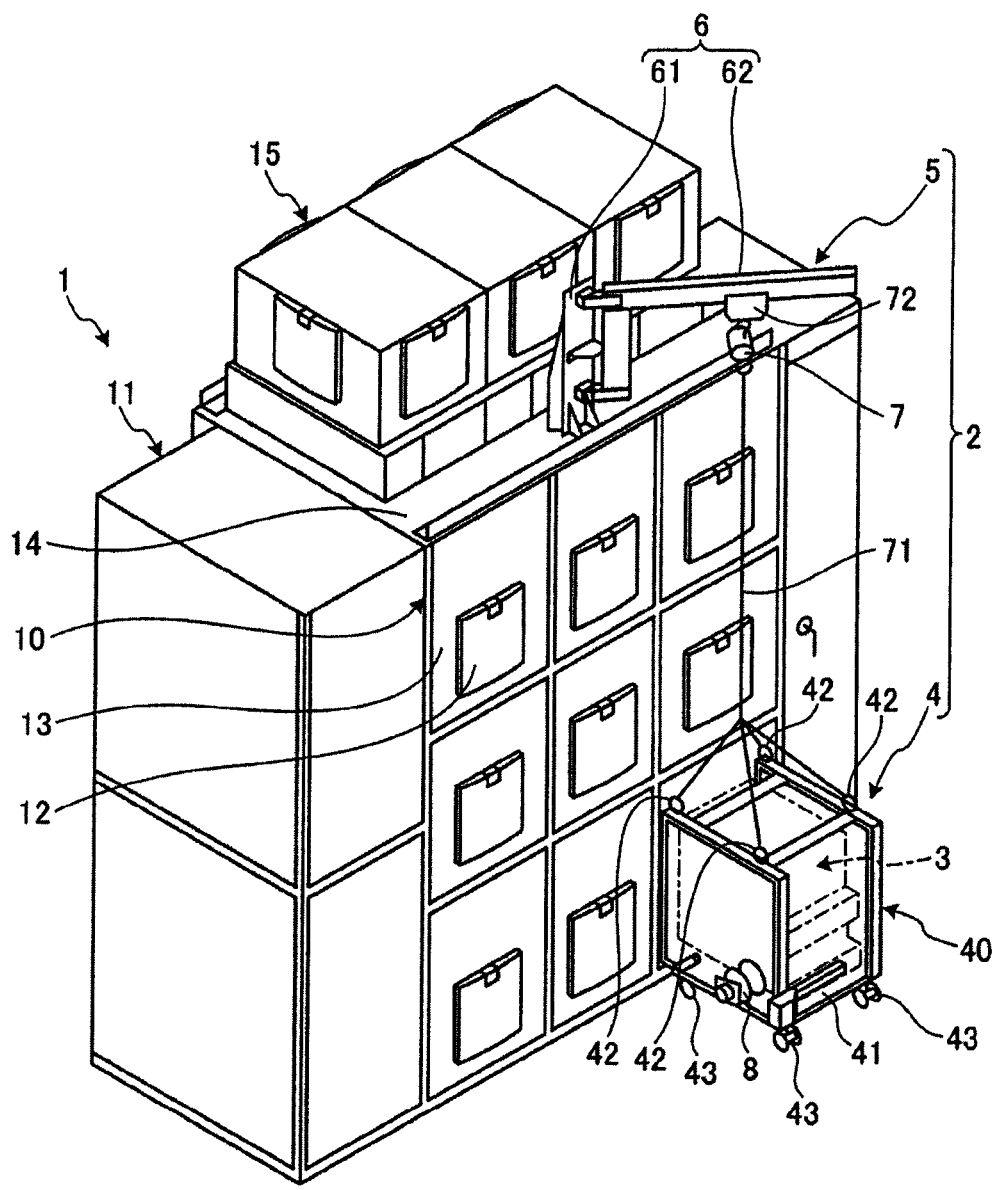
FIG. 1 is a schematic view showing a cubicle according to one embodiment.

FIG. 1 is a schematic view showing the entirety of a cubicle 1 provided with a loading/unloading apparatus 2 according to one embodiment. First, the cubicle 1 and the loading/unloading apparatus 2 will be briefly described with reference to FIG. 1. The cubicle 1 according to the present embodiment includes a box-shaped casing 11 provided with a plurality of storage compartments 10. The cubicle 1 is arranged in a specified power generation facility or the like. Each of the storage compartments 10 is configured to store an electric appliance 3, e.g., a power-converting power cell. An air cooling device 15 for cooling the inside of the cubicle 1 is arranged on a ceiling surface 14 of the cubicle 1. While the air cooling device 15 is described by way of example in the present embodiment, there may be provided a water cooling device.

As shown in FIG. 1, nine (3×3) storage compartments 10 each storing the electric appliance 3 are formed in a lattice pattern. The front opening of each of the storage compartments 10 serving as a gate of the electric appliance 3 is closed by a lid 13. An air suction unit 12 communicating with the inside of each of the storage compartments 10 and having a filer arranged therein is formed in the lid 13. While the number of the storage compartments 10 is nine in the present embodiment, it is also possible to appropriately set the number of the storage compartments 10 as necessary.

A loading/unloading apparatus 2 according to one embodiment includes a cage 4 for loading the electric appliance 3 into each of the storage compartments 10 or for holding the electric appliance 3 taken out from any of the storage compartments 10 and a hoist 5 for vertically moving and hanging the cage 4 in which the electric appliance 3 is held.

The hoist 5 includes a boom 6 installed upright on the ceiling surface 14 of the casing 11 of the cubicle 1 and a hoisting winch 7 attached to the boom 6 and configured to move the cage 4 up and down through a suspending wire 71.

More specifically, the ceiling surface 14 of the casing 11 is formed into a rectangular shape. A lower post 61 making up a portion of the boom 6 is installed upright at the substantially central position of the frontal region of the ceiling surface 14 (where the frontal region refers to the region existing at the side of the lid 13 of the cubicle 1). An upper arm 62 extends from the lower post 61 in the horizontal direction. The hoisting winch 7 is attached to the upper arm 62.

The upper arm 62 is attached to the lower post 61 so as to horizontally swing with respect to the lower post 61. In the cubicle 1, the upper arm 62 can be swung into alignment with the positions of a plurality of (three in the present embodiment) columns of the storage compartments 10 formed in multiple stages (three stages in the present embodiment). As shown in FIG. 1, the air cooling device 15 for cooling the inside of the cubicle 1 is arranged at the rear side of the boom 6.

The cage 4 includes a frame body 40 provided with a seat 41 for supporting the electric appliance 3, and a connector unit connected to the hoisting winch 7. In the cage 4 of the present embodiment, the connector unit is formed of eye bolts 42 arranged at four upper corners of the frame body 40 having a substantially rectangular parallelepiped shape. However, the connector unit is not limited to the eye bolts 42 but may have any configuration as long as the suspending wire 71 can be connected to the connector unit.

Running wheels 43 are provided at four lower corners of the frame body 40. Due to the provision of the four travel wheels 43, the cage 4 can be moved on a floor surface by pushing the frame body 40 with hands.

With the configuration described above, the electric appliance 3 stored in one of the nine storage compartments 10 can be held within the cage 4. The cage 4 can be moved up and down by hanging the cage 4 on the suspending wire 71 suspended from the upper arm 62 of the hoist 5. After the cage 4 is placed on a floor surface, the cage 4 can be moved to a desired place using the travel wheels 43.

As set forth above, the loading/unloading apparatus 2 according to the present embodiment includes the cage 4 for holding the electric appliance 3 to be stored in any of the storage compartments 10 formed in a lattice pattern within the cubicle 1 and the hoist 5 for vertically moving and hanging the cage 4 in which the electric appliance 3 is held. The hoist 5 includes the boom 6 installed upright on the ceiling surface 14 of the cubicle 1 and the hoisting winch 7 attached to the boom 6. The cage 4 includes the frame body 40 provided with the seat 41 for supporting the electric appliance 3 and the eye bolts 42 (the connector unit) connected to the hoisting winch 7.

Figure 2A:
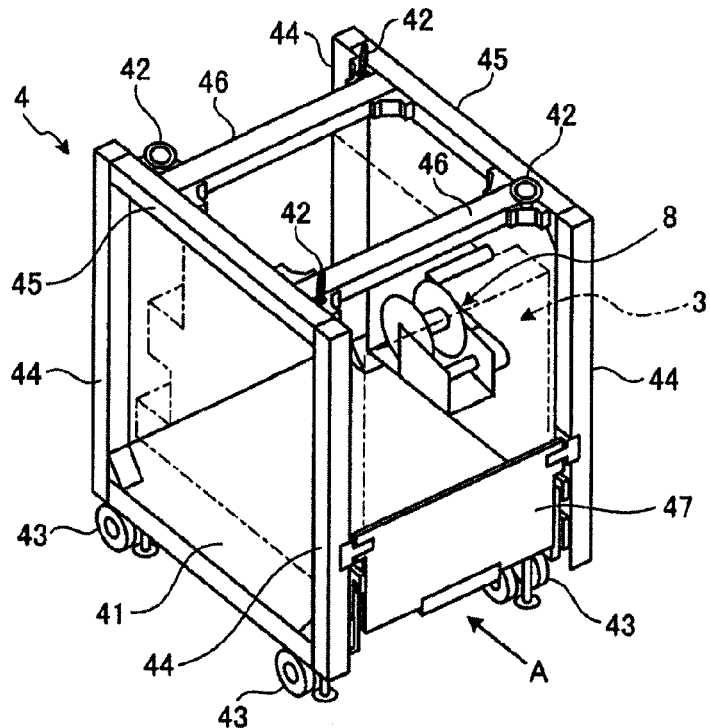
FIG. 2A is an explanatory view showing the folded state of a trestle of a cage according to one embodiment.
Figure 2B:
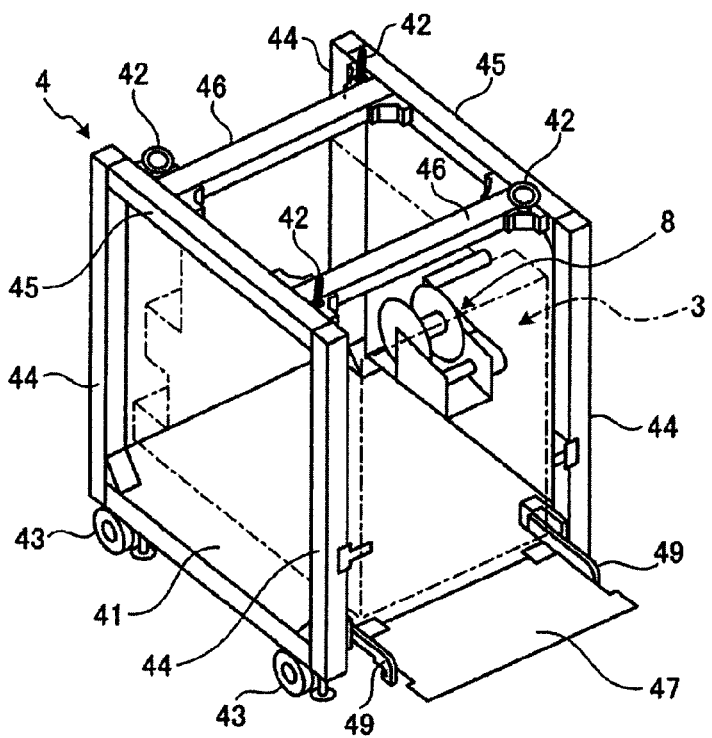
FIG. 2B is an explanatory view showing the unfolded state of the trestle.

Next, the configuration of the cage 4 will be described in more detail with reference to FIGS. 2A and 2B. FIG. 2A is an explanatory view showing the folded state of a trestle 47 of the cage 4. FIG. 2B is an explanatory view showing the unfolded use state of the trestle 47.

As shown in FIGS. 2A and 2B, the cage 4 includes the seat 41 having a rectangular shape. For the sake of convenience in description, the side of the cage 4 indicated by an arrow A in FIG. 2A, namely the side of the cage 4 at which the trestle 47 is arranged, will be referred to as a front side. Vertical frames 44 are installed upright at four corners of the seat 41. The upper ends of the vertical frames 44 existing at the front side and the upper ends of the vertical frames 44 existing at the rear side are connected by first horizontal frames 45. The first horizontal frames 45 are connected by second horizontal frames 46, thereby providing a rigid frame body 40 having a substantially rectangular parallelepiped shape.

The trestle 47 capable of being bridged over any of the storage compartments 10 of the cubicle 1 is arranged at the front side of the frame body 40 in a foldable manner. In the present embodiment, the trestle 47 is pivotally connected to the frontal edge of the seat 41 and is capable of being folded and unfolded. Alternatively, the trestle 47 may be pivotally connected to the frame body 40.

The trestle 47 can be operated such that the trestle 47 is folded in the cage 4 in an upstanding state as shown in FIG. 2A when not in use but is unfolded as shown in FIG. 2B when in use. When unfolded, the trestle 47 is bridged between the cage 4 and any of the storage compartments 10 of the cubicle 1 so that the electric appliance 3 can be smoothly moved between the corresponding storage compartment 10 and the cage 4. The electric appliance 3 is provided on its lower surface with four casters 32 (see FIG. 13) and can be moved by rotating the casters 32.

The eye bolts 42 are arranged at four upper corners of the frame body 40. As stated above, the four eye bolts 42 make up the connector unit connected to the hoisting winch 7 through the suspending wire 71.

As shown in FIGS. 2A and 2B, the cage 4 includes a winding winch 8 for taking out the electric appliance 3 stored in any of the storage compartments 10. The winding winch 8 is arranged in one longitudinal side of the seat 41.

Figure 3A:
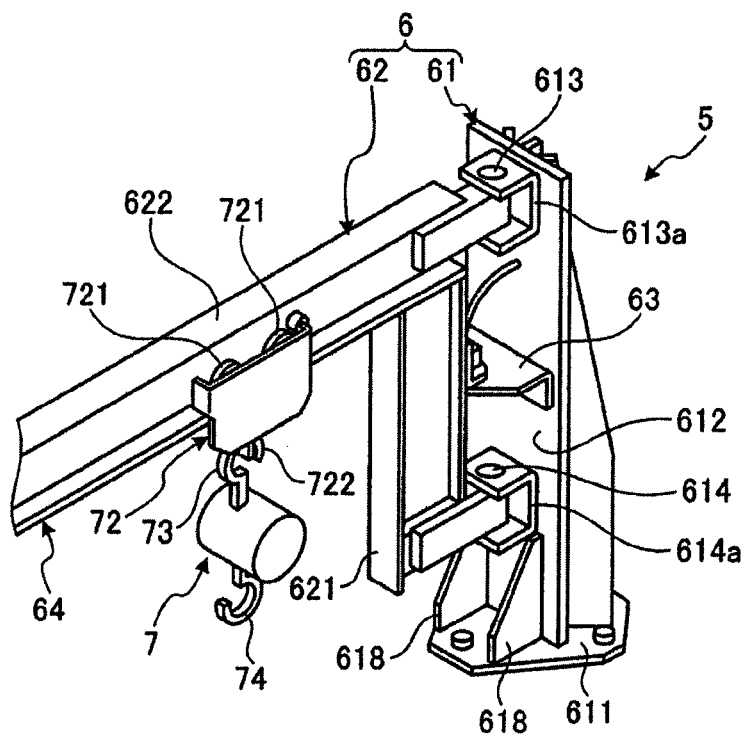
FIG. 3A is a front perspective view showing a hoist according to one embodiment.
Figure 3B:
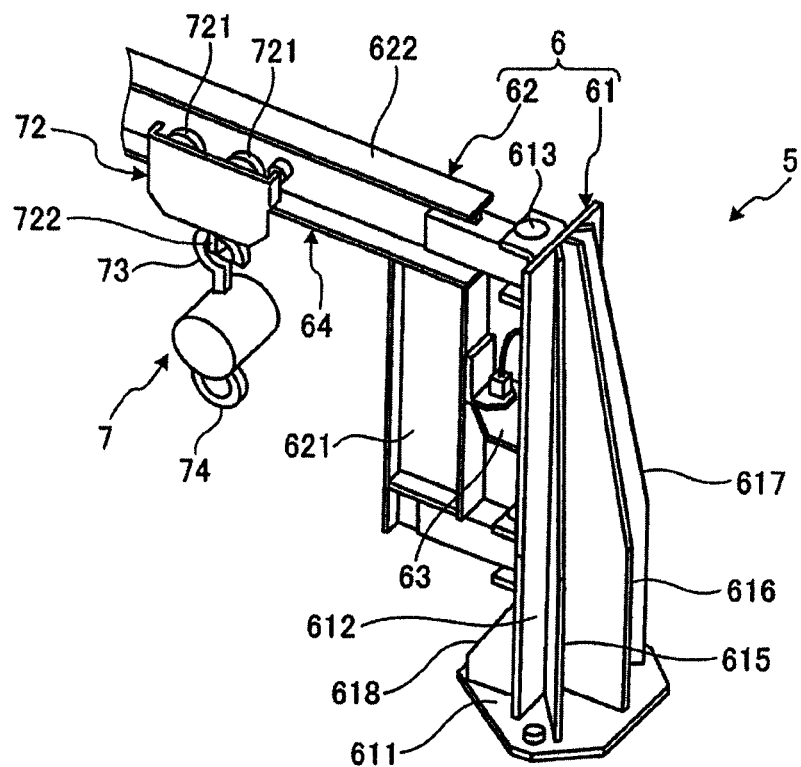
FIG. 3B is a rear perspective view of the hoist.

Next, the hoist 5 will be described with reference to FIGS. 1, 3A and 3B. FIG. 3A is a front perspective view of the hoist 5. FIG. 3B is a rear perspective view of the hoist 5. As shown in FIGS. 3A and 3B, the hoist 5 includes the boom 6 and the hoisting winch 7 arranged on the boom 6. The hoisting winch 7 includes an upper hook 73 connected to a winch attachment unit 72 to be described later and a lower hook 74 to which the suspending wire 71 is connected.

The boom 6 includes the lower post 61 installed upright on the ceiling surface 14 of the cubicle 1 and the upper arm 62 extending from the lower post 61 in the horizontal direction. The hoisting winch 7 is attached to the upper arm 62 through the winch attachment unit 72.

The lower post 61 includes a seat plate 611 fixedly secured to the ceiling surface 14 of the cubicle 1, a rectangular vertical plate 612 attached onto the seat plate 611, and an upper hinge portion 613a and a lower hinge portion 614a arranged on one major surface of the vertical plate 612 with a specified interval left therebetween in the up-down direction. The upper arm 62 is swingably attached to the lower post 61 through an upper pivot shaft 613, the upper hinge portion 613a and a lower pivot shaft 614 of the lower hinge portion 614a. In order to prevent the vertical plate 612 from being bent and buckled, ribs 618 for interconnecting one major surface of the vertical plate 612 and the upper surface of the seat plate 611 are arranged below the lower hinge portion 614a.

The upper arm 62 includes a base member 621 formed into a substantially L-like shape and extending in the vertical direction in a parallel relationship with the upright lower post 61 and a horizontal member 622 extending in the horizontal direction from the upper end of the base member 621. The lower end portion of the base member 621 is connected to the lower pivot shaft 614, and the base end portion of the horizontal member 622 is connected to the upper pivot shaft 613.

As shown in FIGS. 3A and 3B, the lower post 61 of the boom 6 includes a positioning part 63 configured to fix the horizontally-swingable upper arm 62 at any of specified swing angles. A winch attachment part 64 for allowing the hoisting winch 7 to be attached to a specified longitudinal position of the upper arm 62 is formed in the upper arm 62.

As will be described later in more detail, the positioning part 63 is formed into a plate shape and is provided with first to fourth positioning holes 631 to 634 (see FIGS. 5A through 5D) into which a positioning pin 65 is selectively inserted. As shown in FIGS. 3A and 3B, the positioning part 63 is arranged on the front surface of the vertical plate 612 between the upper hinge portion 613*a* and the lower hinge portion 614*a*.

As shown in FIGS. 3A and 3B, the winch attachment part 64 is formed of a flange existing at the left and right side of the horizontal member 622 of the upper arm 62 and is configured to serve as a rail. The winch attachment unit 72 is slidably attached to the winch attachment part 64 serving as a rail in such a state that the winch attachment unit 72 grips the winch attachment part 64. The hoisting winch 7 is hung on the winch attachment unit 72. As shown in FIGS. 3A and 3B, the winch attachment unit 72 includes rolling wheels 721 capable of rolling on the flange and an engaging portion 722 on which the upper hook 73 of the hoisting winch 7 is hung.

As shown in FIG. 3B, a plurality of reinforcing ribs 615, 616 and 617 is provided on the rear surface of the lower post 61. The reinforcing ribs 615, 616 and 617 are arranged in a corresponding relationship with the specified swing angles of the upper arm 62. In other words, the reinforcing ribs 615, 616 and 617 are provided on the rear surface of the vertical plate 612 of the lower post 61 at specified intervals, and the specified intervals are set in one-to-one correspondence to the swing angles of the upper arm 62. More specifically, the reinforcing ribs 615, 616 and 617 are arranged in a radial pattern when seen in a plan view such that, when the upper arm 62 is fixed at one of the specified swing angles, one of the reinforcing ribs 615, 616 and 617 and the upper arm 62 exist on the same imaginary vertical plane.

If the electric appliance 3 as a relatively heavy object having a weight of, e.g., 90 to 100 kg, is hung on the hoisting winch 7, a relatively large load is applied to the vertical plate 612 of the lower post 61. Since the reinforcing ribs 615, 616 and 617 are formed to extend in the load acting direction, it is possible to prevent the vertical plate 612 from being bent or buckled.

Now, a method of loading and unloading the electric appliance 3 into and out of each of the three-stage storage compartments 10 using the hoist 5 arranged in the cubicle 1 will be briefly described with reference to FIGS. 4A through 4D and 5A through 5D. FIGS. 4A through 4D are explanatory views illustrating the use state of the loading/unloading apparatus 2. FIGS. 5A through 5D are explanatory views showing the positioning part 63 of the hoist 5. In the present embodiment, the storage compartments 10 positioned in the lowermost stage of the respective columns are used as targets. Needless to say, the storage compartments 10 positioned in the second stage or the third stage may also be used as targets.

Figure 4A:
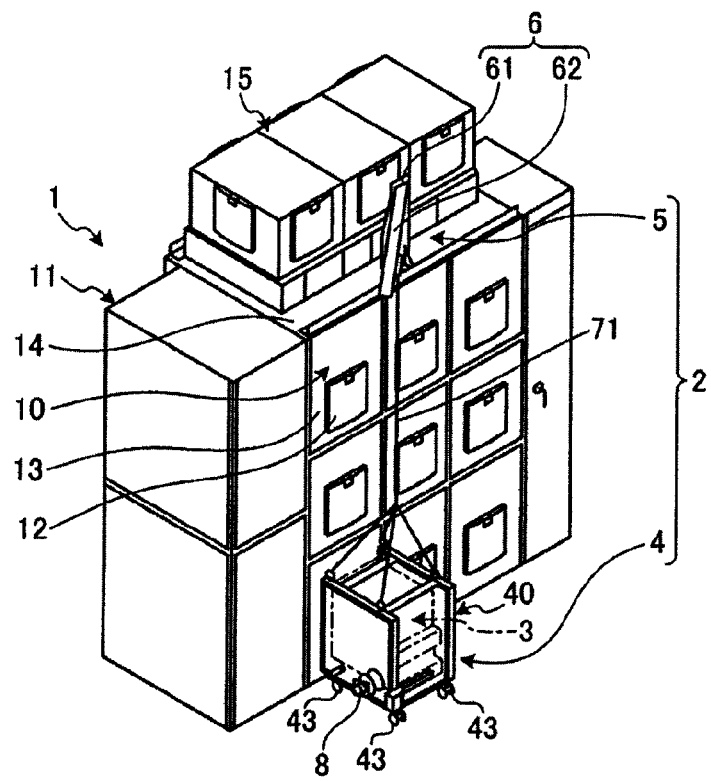
FIGS. 4A through 4D are explanatory views illustrating the use state of a loading/unloading apparatus according to one embodiment.

As shown in FIG. 4A, if the electric appliance 3 is stored into or taken out from one of the storage compartments 10 of the left column when seen from the front side of the cubicle 1, the upper arm 62 of the hoist 5 is located and fixed at a first swing angle.

Figure 5A:
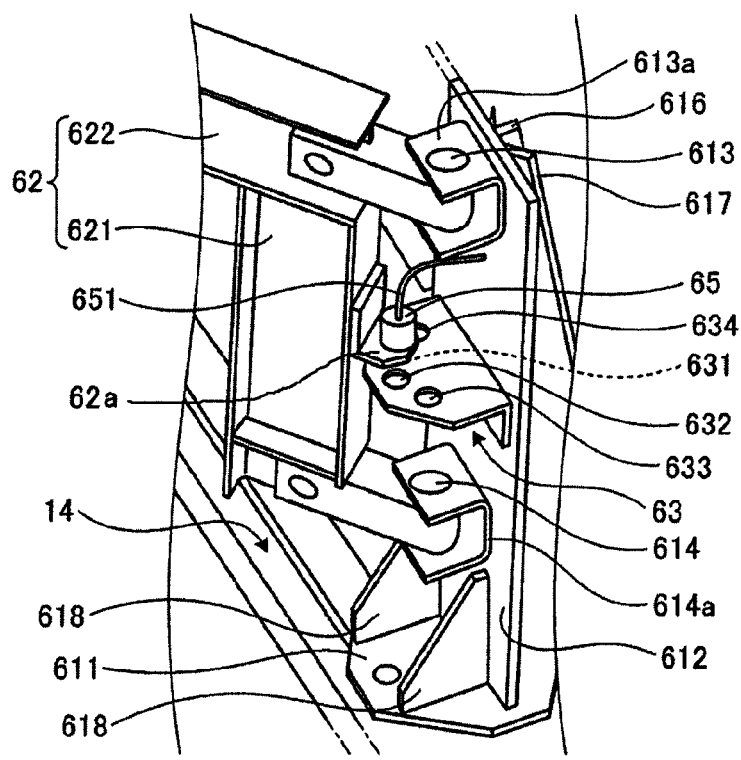
FIGS. 5A through 5D are explanatory views showing a positioning part of the hoist.

As shown in FIGS. 5A through 5D, the first to fourth positioning holes 631 to 634 are formed in the positioning part 63. The first to fourth positioning holes 631 to 634 are arranged in the positions corresponding to the swing angles of the upper arm 62. Accordingly, if one of the storage compartments 10 of the left column when seen from the front side of the cubicle 1 is used as a target as shown in FIG. 4A, the positioning pin 65 is inserted into the first positioning hole 631 through a hole (not shown) of a fixing piece 62*a* provided at the upper arm 62 as shown in FIG. 5A. In the present embodiment, as shown in FIGS. 5A through 5D, the positioning pin 65 is connected to the vertical plate 612 of the lower post 61 by a connecting string (651).

Figure 4B:
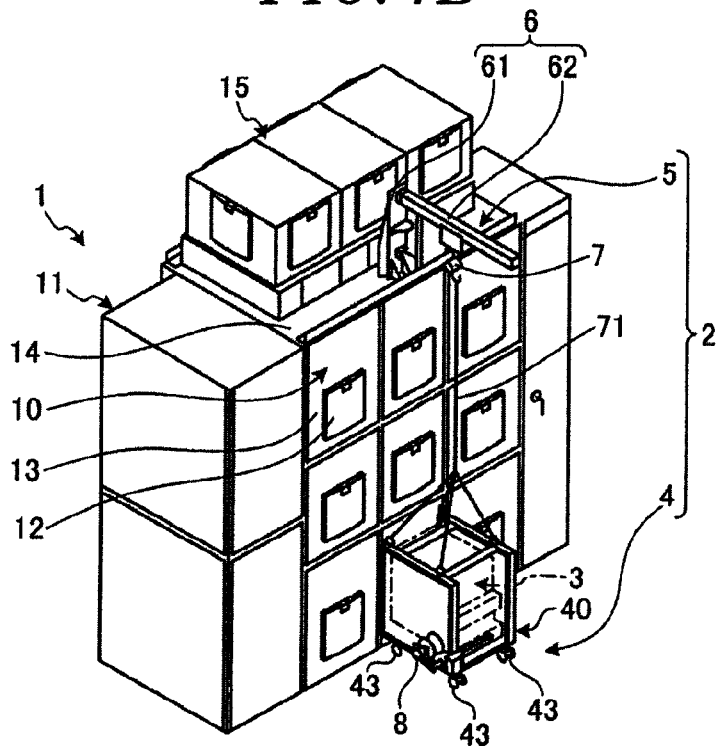
Figure 5B:
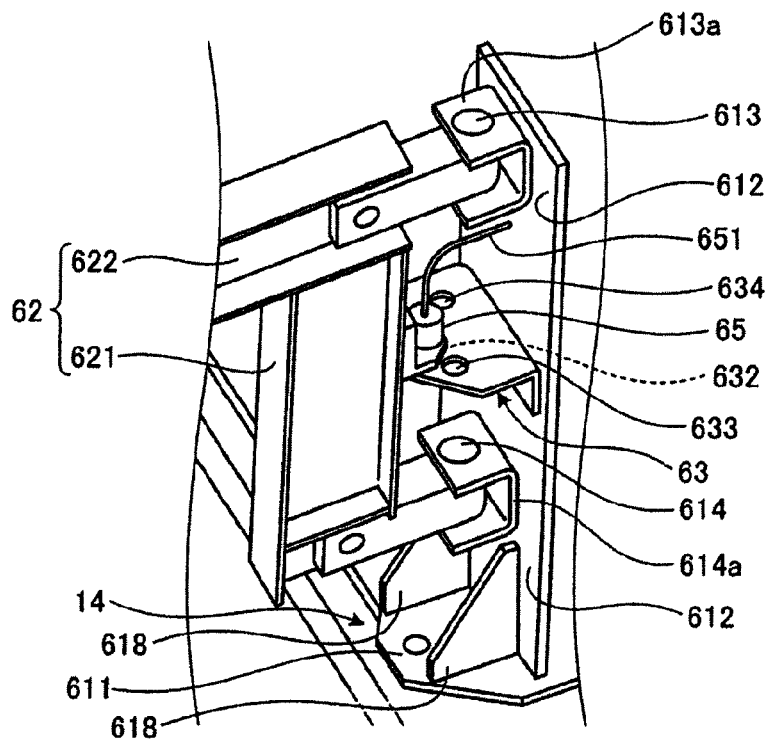

As shown in FIG. 4B, if the electric appliance 3 is stored into or taken out from one of the storage compartments 10 of the center column when seen from the front side of the cubicle 1, the upper arm 62 of the hoist 5 is located and fixed at a second swing angle. In this case, as shown in FIG. 5B, the positioning pin 65 is inserted into the second positioning hole 632 through the hole of the fixing piece 62*a* of the upper arm 62.

Figure 4C:
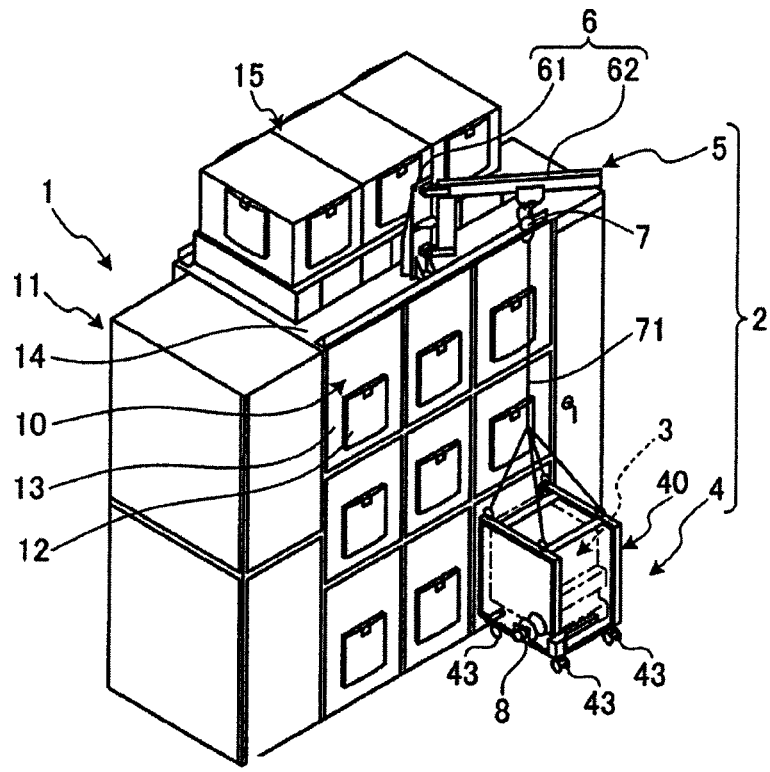
Figure 5C:
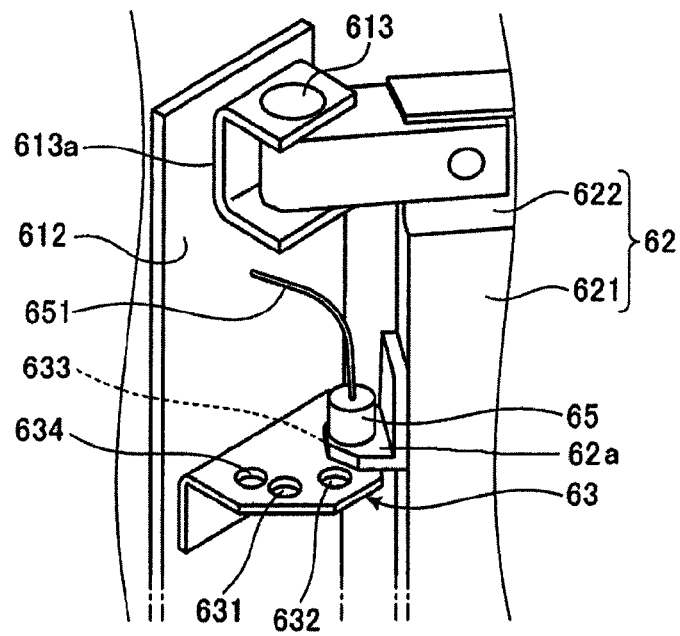

As shown in FIG. 4C, if the electric appliance 3 is stored into or taken out from one of the storage compartments 10 of the right column when seen from the front side of the cubicle 1, the upper arm 62 of the hoist 5 is located and fixed at a third swing angle. In this case, as shown in FIG. 5C, the positioning pin 65 is inserted into the third positioning hole 633 through the hole of the fixing piece 62*a* of the upper arm 62.

As set forth above, the winch attachment unit 72 for hanging the hoisting winch 7 is slidable along the winch attachment part 64. For that reason, even if the upper arm 62 is fixed at any one of the first to third swing angles in alignment with the column to which the storage compartment 10 as a target belongs, the winch attachment unit 72 slides on the winch attachment part 64. Thus, the hoisting winch 7 can always be positioned just above the cage 4.

Figure 4D:
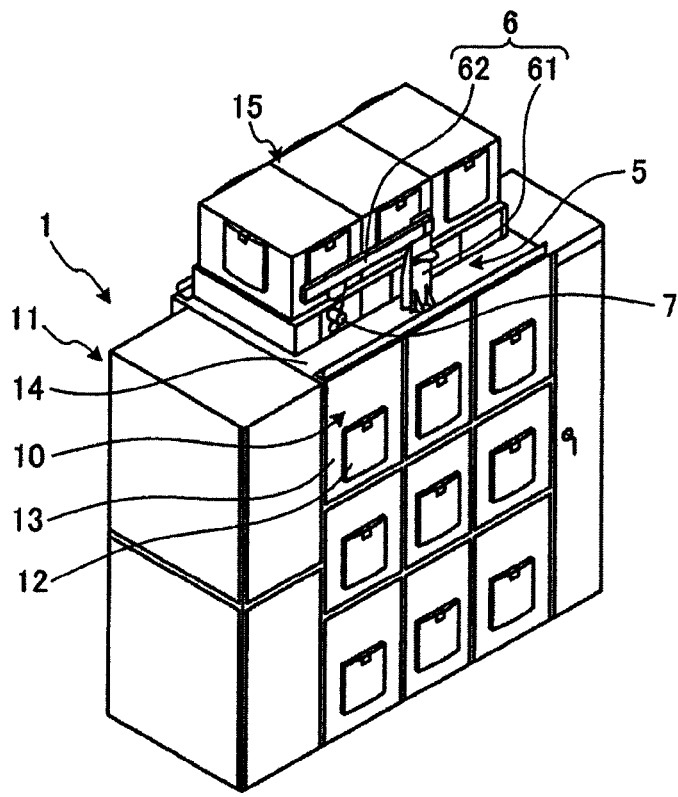
Figure 5D:
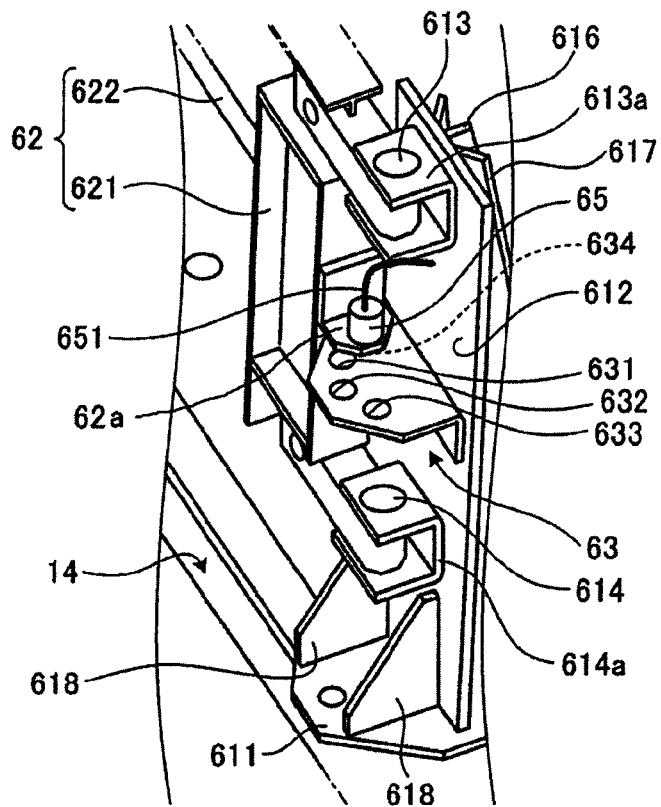

If the loading/unloading apparatus 2 is not in use, namely if the hoist 5 and the cage 4 are not used, the upper arm 62 of the hoist 5 is fixed at a fourth swing angle, namely in the position where the upper arm 62 is accommodated within the ceiling surface 14 of the cubicle 1 as shown in FIG. 4D. In this case, as shown in FIG. 5D, the positioning pin 65 is inserted into the fourth positioning hole 634 through the hole of the fixing piece 62*a* of the upper arm 62. The cage 4 is stored in a suitable place. The cage 4 may be stored in a surplus space on the ceiling surface 14 of the cubicle 1. When the loading/unloading apparatus 2 is not in use, no large load is applied to the vertical plate 612 of the lower post 61. Therefore, there is no need to employ a reinforcing rib corresponding to the fourth positioning hole 634.

Figure 9:
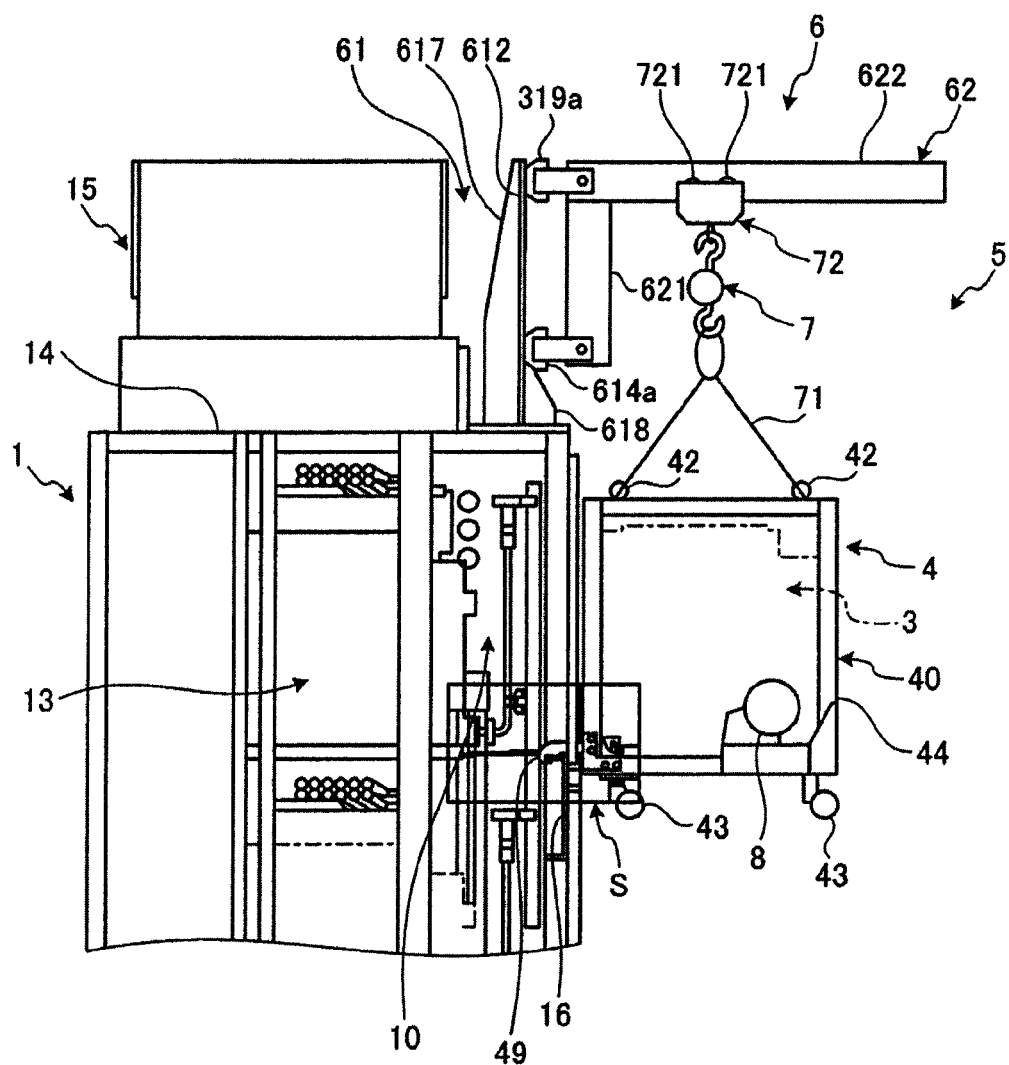
FIG. 9 is an explanatory view showing a state that the cage is fixed to a cubicle.
Figure 10:
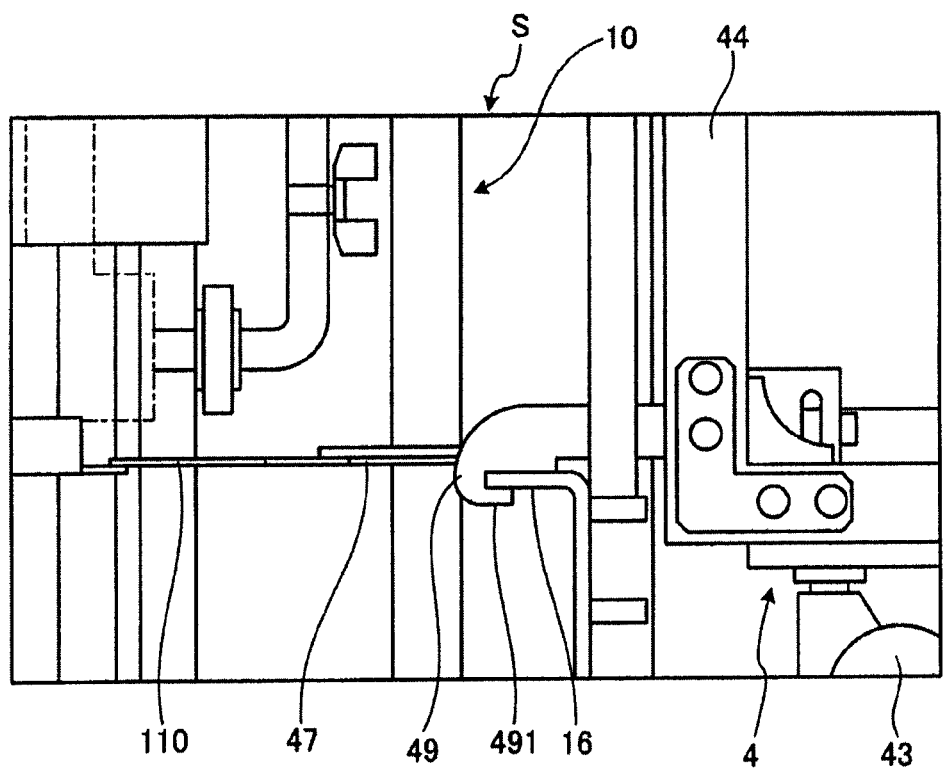
FIG. 10 is an enlarged view of the region S indicated in FIG. 9.
Figure 11:
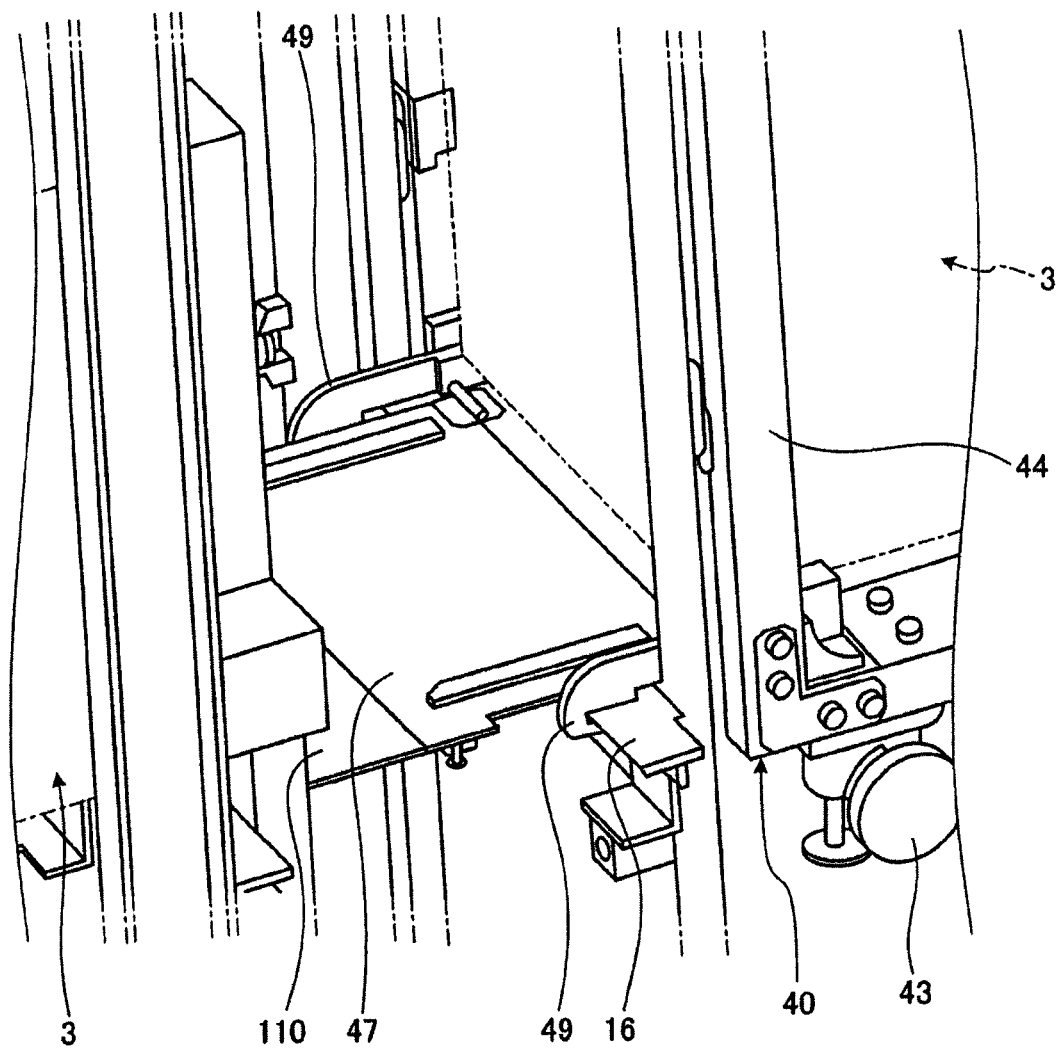
FIG. 11 is an explanatory view showing a state that the cage is bridged over the cubicle.

Next, the more detailed configuration of the cage 4 will be described with reference to FIGS. 6A through 11, with emphasis placed on a structure for fixing the cage 4 to a desired storage compartment 10 of the cubicle 1. FIGS. 6A and 6B are explanatory views showing the configuration of bumper parts 48 serving as a part of the fixing unit of the cage 4. FIGS. 7A through 7D are explanatory views showing the use procedure of the trestle 47 and the fixing unit. FIGS. 8A through 8D are explanatory views illustrating the operation of the engaging part 49. The engaging part 49 serves as a part of the fixing unit of the cage 4 according to the present embodiment. FIG. 9 is an explanatory view showing a state where the cage 4 is fixed to the cubicle 1. FIG. 10 is an enlarged view of the region S indicated in FIG. 9. FIG. 11 is an explanatory view showing a state where the cage 4 is bridged over the cubicle 1.

As shown in FIGS. 6A and 6B, the cage 4 includes the bumper parts 48 for stably supporting the cage 4 while preventing the cage 4 from colliding with or making direct contact with the front surface of the cubicle 1. The bumper parts 48 are arranged below the trestle 47 (see FIGS. 2A and 2B) existing at the front side of the frame body 40.

As depicted in FIGS. 6A and 6B, each of the bumper parts 48 includes a base portion 481 whose base end is fixed to the seat portion 41, a swingable portion 483 provided at its tip end with a pad 482 made of resin such as rubber or the like, and a hinge 484 for interconnecting the base portion 481 and the swingable portion 483 in a foldable manner.

As shown in FIG. 6A, when the bumper part 48 is not in use, the swingable portion 483 is folded inward with the pad 482 facing toward the cage 4. On the other hand, when the cage 4 is connected to the cubicle 1 in order to load or unload the electric appliance 3, the swingable portion 483 is swung 180 degrees as shown in FIG. 6B so that the pad 482 can face outward and can protrude from the frame body 40.

Next, the configuration and use procedure of the trestle 47 and the engaging part 49 used in fixing the cage 4 to the front surface of each of the storage compartments 10 of the cubicle 1 and in loading and unloading the electric appliance 3 will be described with reference to FIGS. 7A through 7D and 8A through 8D.

FIG. 7A shows the non-use state of the trestle 47 and the engaging part 49. This state is assumed to be an initial state. As shown in FIG. 7A, when not in use, the trestle 47 is folded within the frame body 40 of the cage 4 in an upstanding state. The trestle 47 is merely connected to the seat portion 41 by a hinge 472 (see FIG. 7C) and, as shown in FIGS. 7A and 7B, the trestle 47 is held in the upstanding state by a stopper 441 provided at each of the front vertical frames 44. The stopper 441 includes a knob portion 442 and a cutout portion 443 engaging with a locking pin 471 of the trestle 47.

In this initial state, as shown in FIG. 7B, the bumper part 48 is unfolded with the pad 482 facing forward and the engaging part 49 is laid down forward. At this time, as shown in FIGS. 8A through 8C, the engaging part 49 is first lifted up and is then laid down forward.

More specifically, as shown in FIGS. 8A through 8D, the engaging part 49 includes a hook-shaped claw portion 491 formed in the tip end portion thereof and a slot 492 formed in the base end portion thereof. The frame body 40 of the cage 4 is provided with an engaging-member attachment portion 50. A pin 52 protruding from the engaging-member attachment portion 50 is inserted into the slot 492 of the engaging part 49. As shown in FIG. 8A, a stopper body 53 protrudes from the engaging-member attachment portion 50 to make contact with the base end portion of the engaging part 49 kept in an upstanding state. Since the engaging part 49 kept in an upstanding state makes contact with the stopper body 53, it is impossible to push the engaging part 49 forward.

For that reason, the engaging part 49 is first lifted up (see FIG. 8B) and is then laid down forward (see FIG. 8C).

While not shown herein, the engaging part 49 is locked to a beam member 16 (see FIGS. 9 and 10) arranged at the side of the storage compartments 10 of the cubicle 1 in the state where the engaging part 49 is laid down forward. As shown in FIG. 7C, the stopper 441 is released to lay down the trestle 47 forward. Thereafter, the engaging part 49 is pushed toward the cage 4, thereby reliably fixing the cage 4 to the front end of the storage compartment 10.

At this time, as shown in FIG. 8D, a set screw 51 provided in the engaging-member attachment portion 50 is threadedly coupled to the base end portion of the engaging part 49, thereby pulling and fixing the engaging part 49.

Pursuant to the procedure shown in FIGS. 7A through 7D, the cage 4 can be reliably fixed to the front side of the cubicle 1 as illustrated in FIGS. 9 through 11.

More specifically, as shown in FIGS. 9 and 10, the upper arm 62 of the hoist 5 is swung into alignment with a desired column. The empty cage 4 is lifted up by the hoisting winch 7. The lifting operation is stopped when the cage 4 comes into alignment with the storage compartment 10 of the desired stage. Pursuant to the aforementioned procedure (see FIGS. 7A through 7D), the cage 4 is fixed to the front side of the cubicle 1 using the fixing unit (the bumper part 48 and the engaging part 49) and the trestle 47.

The cage 4 is reliably fixed to the beam member 16 of the cubicle 1 through the engaging part 49 and the trestle 47 is bridged over the clearance between the cage 4 and the storage compartment 10 (see FIG. 10). In the loading/unloading apparatus 2 of the present embodiment, as shown in FIG. 10, an auxiliary plate 110 is installed between the trestle 47 and the storage compartment 10. More specifically, in the cubicle 1 of the present embodiment, an internal clearance is formed between the surface for substantially supporting the electric appliance 3 within the storage compartment 10 and the front surface of the cubicle 1. This internal clearance is filled with the auxiliary plate 110.

Accordingly, as shown in FIG. 11, the electric appliance 3 existing inside the storage compartment 10 can be smoothly moved to the cage 4. Needless to say, the electric appliance 3 accommodated within the cage 4 can be smoothly moved into the storage compartment 10.

As set forth above, the cage 4 is provided with the fixing unit that includes the bumper part 48 capable of making contact with the front surface of the cubicle 1 and the engaging part 49 for engaging with the cubicle 1 to hold the cage 4 in place in a state that the cage 4 is spaced apart from the cubicle 1 at a specified interval. This makes it possible to fix the cage 4 to the cubicle 1. Therefore, the cage 4 is prevented from shifting in the up-down, left-right and front-rear directions. The electric appliance 3 can be smoothly and safely unloaded from the cubicle 1 to the cage 4. In the present embodiment, it is assumed that the electric appliance 3 is moved from the cubicle 1 to the cage 4. It goes without saying that the task of loading the electric appliance 3 from the cage 4 into the cubicle 1 is performed in a similar manner.

Figure 12:
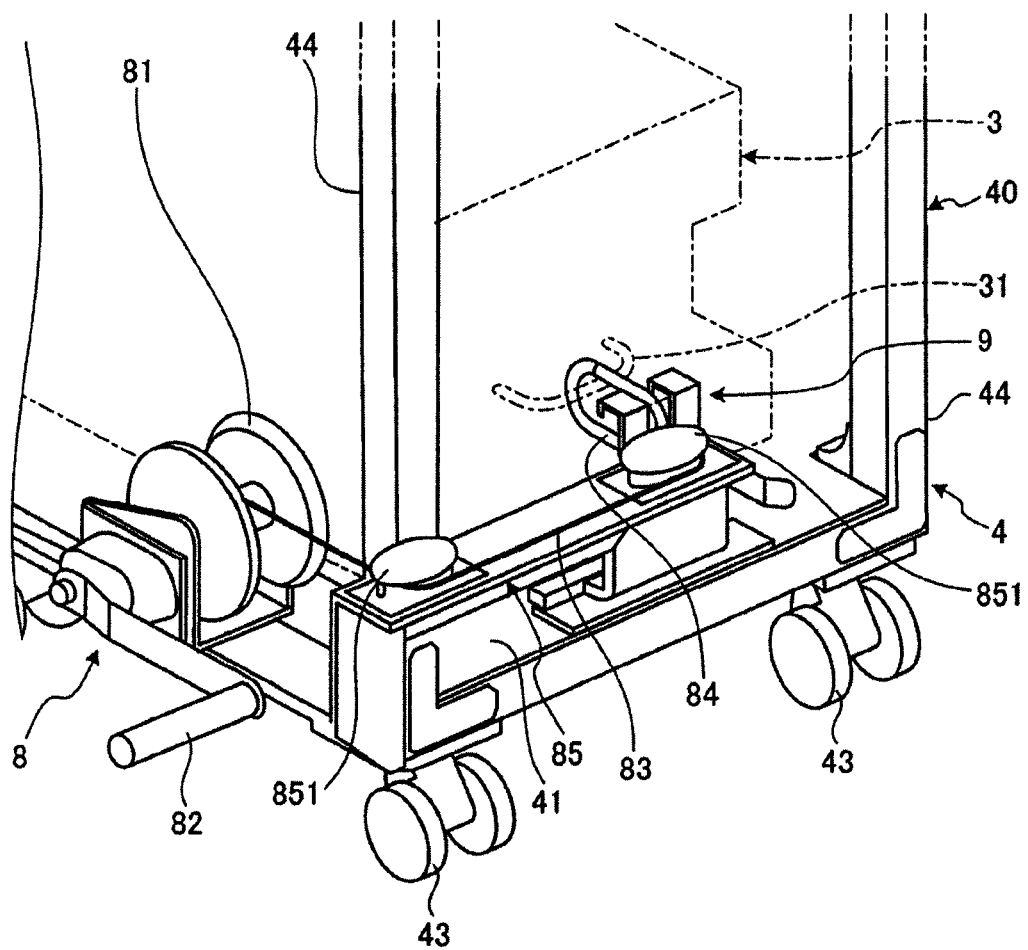
FIG. 12 is an explanatory view showing a winding winch according to one embodiment.
Figure 13:
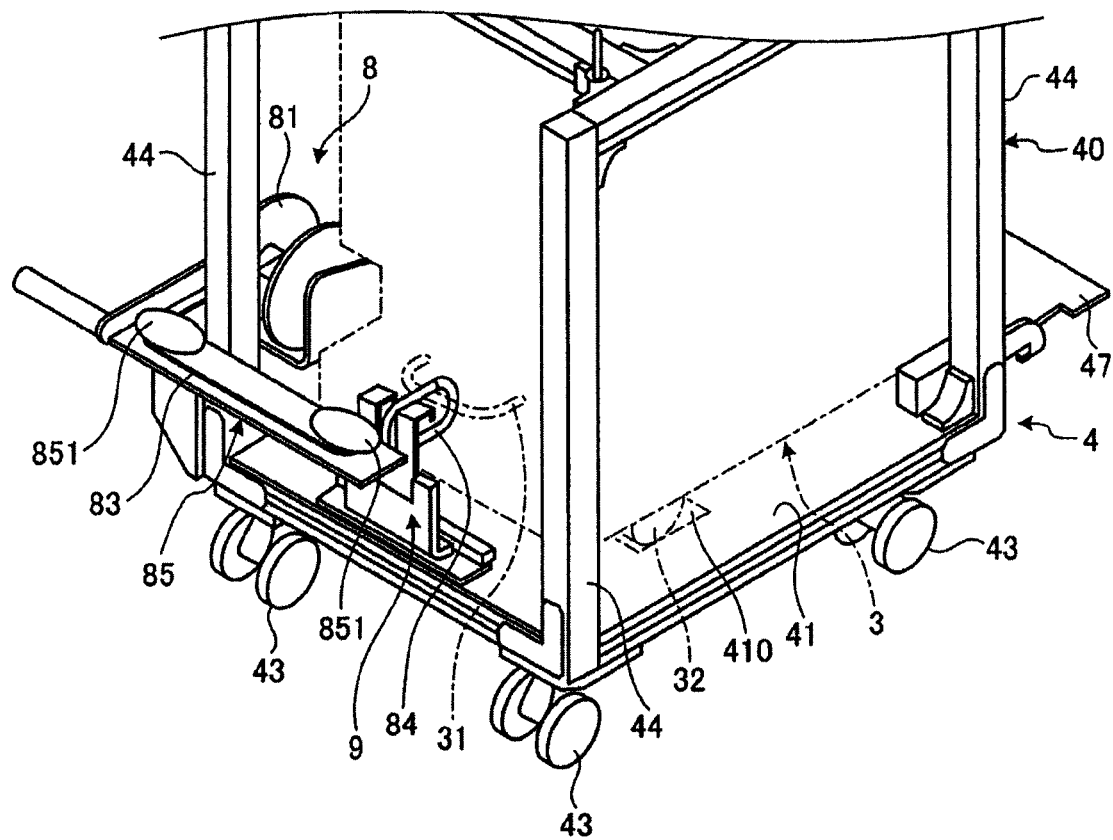
FIG. 13 is an explanatory view showing a wire guide unit according to one embodiment.

The winding winch 8 provided for the cage 4 is used in unloading the electric appliance 3 from the inside of the storage compartment 10. FIG. 12 is an explanatory view showing the winding winch 8. FIG. 13 is an explanatory view showing a wire guide unit 85.

As shown in FIG. 12, the winding winch 8 is detachably attached to one longitudinal side of the seat portion 41 of the cage 4. The winding winch 8 includes a winding wire 83, a drum 81 wound with the winding wire 83, and a handle 82 for manually rotating the drum portion 81.

Thanks to the provision of the winding winch 8, as shown in FIGS. 12 and 13, the electric appliance 3 as a heavy object can be easily moved into the cage 4 by bringing a connector 84 such as a carabiner or the like, which is attached to the tip end of the winding wire 83, into engagement with a grip 31 arranged on one surface of the electric appliance 3 and rotating the handle 82 to rewind the winding wire 83 around the drum portion 81. Since the winding winch 8 is detachable, it may be possible to remove the winding winch 8 if there is no need to use the winding winch 8. This makes it possible to eliminate an obstacle protruding from the cage 4 and to reduce the weight of the cage 4.

The winding wire 83 is led from the drum portion 81 to the rear side of the cage 4, namely to the front side in FIG. 12. Then, the winding wire 83 is direction-changed to extend toward the substantially central portion of the cage 4 via the wire guide unit 85 arranged along the rear edge of the frame body 40 of the cage 4.

As shown in FIGS. 12 and 13, the wire guide unit 85 includes guide rollers 851 respectively arranged in the substantially central position of the rear edge of the frame body 40 of the cage 4 and in one lateral end position of the rear edge of the frame body 40 near the winding winch 8.

Since the cage 4 is provided with the wire guide unit for guiding the winding wire 83 interconnecting the winding winch 8 and the electric appliance 3, it is possible to easily perform the unloading task of the electric appliance 3 with the winding winch 8.

As described above, the electric appliance 3 is provided with four casters 32. As shown in FIG. 13, the seat 41 of the cage 4 has recess portions 410 for dropping at least two front casters 32 therein.

Accordingly, if the electric appliance 3 is brought into the cage 4 by the winding winch 8, the casters 32 existing at the front side (the side toward which the surface of the electric appliance 3 having the grip 31 faces) are dropped into the recess portions 410 and are restrained from rolling. For that reason, it is possible to prevent the electric appliance 3 as a heavy object from moving inadvertently.

After the front casters 32 of the electric appliance 3 are dropped into the recess portions 410, an appliance fixing unit 9 is used to reliably hold the electric appliance 3 in place. In other words, the cage 4 includes the appliance fixing unit 9 for fixing the electric appliance 3 to the cage 4 in a state where the electric appliance 3 is accommodated within the cage 4.

FIGS. 14A and 14B are explanatory views showing the appliance fixing unit 9 of the cage 4. As shown in FIGS. 14A and 14B, the appliance fixing unit 9 is arranged to overlap in the front-rear direction with the guide roller 851 of the wire guide unit 85 positioned in the substantially central position of the rear edge of the seat 41.

The appliance fixing unit 9 includes a guide plate 93 installed upright on the seat portion 41 of the cage 4 and a hook plate 90 configured to vertically slide along the guide plate 93 and provided with two hooks 91 engageable with the grip 31 of the electric appliance 3.

A pair of left and right fixing bolts 94 horizontally protrudes from the guide plate 93. The hook plate 90 has slots 92 into which the respective fixing bolts 94 are inserted. The slots 92 are formed in the base portions of the respective hooks 91. The fixing bolts 94 can fix the hook plate 90 to the guide plate 93 and can serve as sliding guide pins for enabling the hook plate 90 to smoothly slide in the up-down direction.

With this configuration, pursuant to the following procedure, the electric appliance 3 can be reliably fixed to the cage 4. More specifically, as shown in FIG. 14A, the hook plate 90 is fixed by the fixing bolts 94 in a lifted state. Then, the electric appliance 3 existing within the storage compartment 10 is moved forward by the winding winch 8 and is accommodated within the cage 4. At this time, the winding wire 83 of the winding winch 8 passes through between the hooks 91.

Subsequently, as shown in FIG. 14B, the fixing bolts 94 are loosened and the hook plate 90 is moved down, thereby bringing the hooks 91 into engagement with the grip 31 of the electric appliance 3. In this state, the fixing bolts 94 are tightened and fixed.

By reliably fixing the electric appliance 3 to the cage 4, it is possible to prevent the electric appliance 3 from being dropped from the cage 4 when the cage 4 holding the electric appliance 3 is moved up and down or moved on a floor surface.

Another Embodiment

Figure 15:
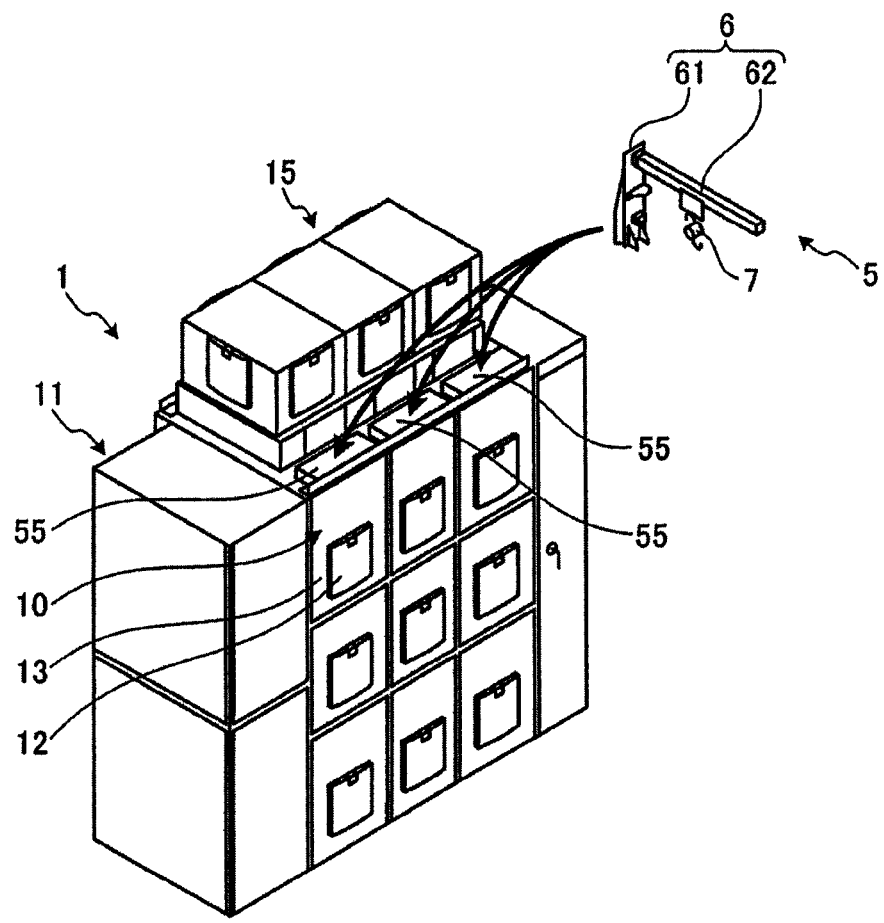
FIG. 15 is an explanatory view showing a hoist according to another embodiment.

In the embodiment described above, the hoist 5 has the configuration in which the lower post 61 is directly installed upright on the ceiling surface 14 of the cubicle 1. Alternatively, the hoist 5 may have, e.g., a configuration shown in FIG. 15. FIG. 15 is an explanatory view showing a hoist 5 according to another embodiment. The hoist 5 of the present embodiment is substantially identical in configuration with the hoist 5 of the aforementioned embodiment, And no description will be made on the same components as those of the aforementioned embodiment.

In the hoist 5 of the present embodiment, as shown in FIG. 15, boom attachment parts 55 arranged in one-to-one correspondence to the columns of the multi-stage storage compartments 10 are provided on the ceiling surface 14 of the cubicle 1. A boom 6 can be detachably attached to each of the boom attachment parts 55.

Just like the foregoing embodiment, the boom 6 of the present embodiment includes a lower post 61 and an upper arm 62. The lower post 61 can be selectively attached to each of the boom attachment parts 55.

In the present embodiment, as described above, the cubicle 1 is provided with the boom attachment parts 55, on which the boom 6 is attached, in the positions corresponding to the storage compartments 10. The boom 6 can be detachably attached to one of the boom attachment parts 55.

For example, the boom 6 can be detachably attached to one of the boom attachment parts 55 by forming through-holes in the seat plate 611, forming thread holes in each of the boom attachment parts 55 and tightening, e.g., bolts into the thread holes of each of the boom attachment parts 55 through the through-holes of the seat plate 611. In the present embodiment, the description has been made on an example in which the bolts are used to fix the boom 6. Instead of using the bolts, the boom 6 may be detachably attached to one of the boom attachment parts 55 in other manners.

In some cases, the loading/unloading apparatus 2 of this kind may not be used for a long period of time. With the configuration of the present embodiment, the boom 6 and the hoisting winch 7 are normally stored in other places and may be brought to the cubicle 1 whenever there is a need to use the boom 6 and the hoisting winch 7.

In the present embodiment, a plurality of the boom attachment parts 55 is provided on the ceiling surface 14 of the cubicle 1. However, one boom attachment part 55 may be provided on the ceiling surface 14 of the cubicle 1.

The loading/unloading apparatus 2 described above in respect of the embodiments can easily and safely perform the task of unloading the heavy electric appliances 3 arranged in multiple stages within the cubicle 1 or the task of loading a new electric appliance 3 into the cubicle 1, even if the cubicle 1 is installed in a narrow place.

In the respective embodiments described above, the boom 6 of the hoist 5 is arranged on the ceiling surface 14 of the cubicle 1. However, the installation place of the boom 6 is not limited to the ceiling surface 14 but may be any position corresponding to the storage compartments 10. For example, the boom 6 may be attached to the side surface of the cubicle 1 so as to extend above the storage compartments 10.

In the winch attachment part 64 of the hoist 5, a flange is formed at the left and right sides of the horizontal member 622 of the upper arm 62 and is allowed to serve as a rail. Accordingly, the hoisting winch 7 can be attached to a specified longitudinal position of the upper arm 62. However, the configuration of the winch attachment part 64 is not limited to the above. For example, a plurality of holes into which the upper hook 73 of the hoisting winch 7 can be inserted may be formed in the positions corresponding to the swing angles of the upper arm 62. The holes thus formed may be used as the winch attachment part 64.

In the respective embodiments described above, the fixing unit of the cage 4 is configured to include the bumper part 48 and the engaging part 49 arranged in the lower portion of the cage 4. In order to further enhance the safety, a fixing unit connectable to the cubicle 1 may be appropriately arranged in the upper portion of the cage 4. In this case, the fixing unit may include a fastening member such as a bolt or the like or may include a locking member like the engaging part 49.

The electric appliance 3 described above is provided with four casters 32. The recess portions 410 formed in the seat portion 41 of the cage 4 are configured such that two front casters 32 can be dropped therein. However, the number of the casters 32 is not limited to the above. Further, the recess portion 410 may be formed in any number as long as at least one caster 32 can be dropped therein.

Other effects and modified examples can be readily derived by those skilled in the relevant art. For that reason, the broad aspect of the present invention is not limited to the specific disclosures and the representative embodiments shown and described above. Accordingly, the present invention can be modified in many different forms without departing from the spirit and scope of the invention defined by the appended claims and the equivalents thereof.

What is claimed is:

1. An apparatus configured to be installed on a cubicle to load and unload an electrical equipment into and from one of a plurality of storage compartments provided in the cubicle, the apparatus comprising:
   a cage configured to accommodate the electrical equipment to be loaded into or to be unloaded from said one of the storage compartments; and
   a hoist configured to hold and vertically move the cage,
   wherein the hoist includes a boom configured to be arranged on the cubicle to extend above the storage compartments and a hoisting winch attached to the boom, and
   wherein the cage includes:
      a frame body provided with a seat configured to support the electrical equipment;
      a connector unit connected to the hoisting winch;
      a winding winch configured to unload the electrical equipment from said one of the storage compartments; and
      a trestle capable of being bridged over said one of the storage compartments, the trestle being provided at the frame body in a foldable manner.

2. The apparatus of claim 1, wherein the cage further includes a plurality of travel wheels.

3. The apparatus of claim 1, wherein the boom includes:
   a lower post configured to be installed upright on a ceiling surface of the cubicle; and
   an upper arm horizontally extending from the lower post, the upper arm horizontally swingably attached to the lower post,
   wherein the lower post includes a positioning part configured to selectively fix the upper arm to the lower post at one of a plurality of swing angles and
   wherein the upper arm includes a winch attachment part for selectively fixing the hoisting winch to one of various longitudinal positions of the upper arm.

4. The apparatus of claim 2, wherein the boom includes:
   a lower post configured to be installed upright on a ceiling surface of the cubicle; and
   an upper arm horizontally extending from the lower post, the upper arm horizontally swingably attached to the lower post,
   wherein the lower post includes a positioning part configured to selectively fix the upper arm to the lower post at one of a plurality of swing angles, and
   wherein the upper arm includes a winch attachment part for selectively fixing the hoisting winch to one of various longitudinal positions of the upper arm.

5. The apparatus of claim 3, wherein the lower post includes a plurality of reinforcing ribs arranged on a rear surface of the lower post, the reinforcing ribs being arranged in one-to-one correspondence to the swing angles.

6. The apparatus of claim 4, wherein the lower post includes a plurality of reinforcing ribs arranged on a rear surface thereof, the reinforcing ribs being arranged in one-to-one correspondence to the swing angles.

7. The apparatus of claim 1, further comprising:
   one or more boom attachment parts configured to be installed on a ceiling surface of the cubicle in positions corresponding to the storage compartments, wherein the boom is detachably attached to one of the boom attachment parts.

8. The apparatus of claim 2, further comprising:
   one or more boom attachment parts configured to be installed on a ceiling surface of the cubicle in positions corresponding to the storage compartments, wherein the boom is detachably attached to one of the boom attachment parts.

9. The apparatus of claim 7, wherein the boom attachment parts are configured to be arranged on the ceiling surface of the cubicle in one-to-one correspondence to a plurality of columns in which the storage compartments are formed in multiple stages, the boom including a lower post detachably attached to one of the boom attachment parts and an upper arm horizontally extending from the lower post, the upper arm including a winch attachment part for fixing the hoisting winch to a specified longitudinal position of the upper arm.

10. The apparatus of claim 8, wherein the boom attachment parts are configured to be arranged on the ceiling surface of the cubicle in one-to-one correspondence to a plurality of columns in which the storage compartments are formed in multiple stages, the boom including a lower post detachably attached to one of the boom attachment parts and an upper arm horizontally extending from the lower post, the upper arm including a winch attachment part for fixing the hoisting winch to a specified longitudinal position of the upper arm.

11. The apparatus of claim 1, wherein the cage further includes a fixing unit for fixing the cage to the cubicle, the fixing unit eluding a bumper part capable of making contact with a front surface of the cubicle and an engaging part for engaging with the cubicle to hold the cage in place in a state that the cage is spaced apart from the cubicle at a specified interval by the bumper part.

12. The apparatus of claim 3, wherein, the cage further includes a fixing unit for fixing the cage to the cubicle, the fixing unit including a bumper part capable of making contact with a front surface of the cubicle and an engaging part for engaging with the cubicle to hold the cage in place in a state that the cage is spaced apart from the cubicle at a specified interval by the bumper part.

13. The apparatus of claim 1, wherein the cage further includes a wire guide unit configured to guide a winding wire for interconnecting the winding winch and the electrical equipment.

14. The apparatus of claim 1, further comprising:
   an equipment fixing unit configured to fix the electrical equipment to the cage in a state where the electrical equipment is accommodated within the cage.

15. The apparatus of claim 3, further comprising:
   an equipment fixing unit configured to fix the electrical equipment to the cage in a state where the electrical equipment is accommodated within the cage.

16. The apparatus of claim 1, wherein the seat of the cage has at least one recess portion configured to accommodate therein a caster that is provided to the electrical equipment.

17. The apparatus of claim 3, wherein the seat of the cage has at least one recess portion configured to accommodate therein a caster that is provided to the electrical equipment.

\* \* \* \* \*